E. A. OLLEY.
PANEL BOARD.
APPLICATION FILED JULY 16, 1915.
1,307,019.
Patented June 17, 1919.
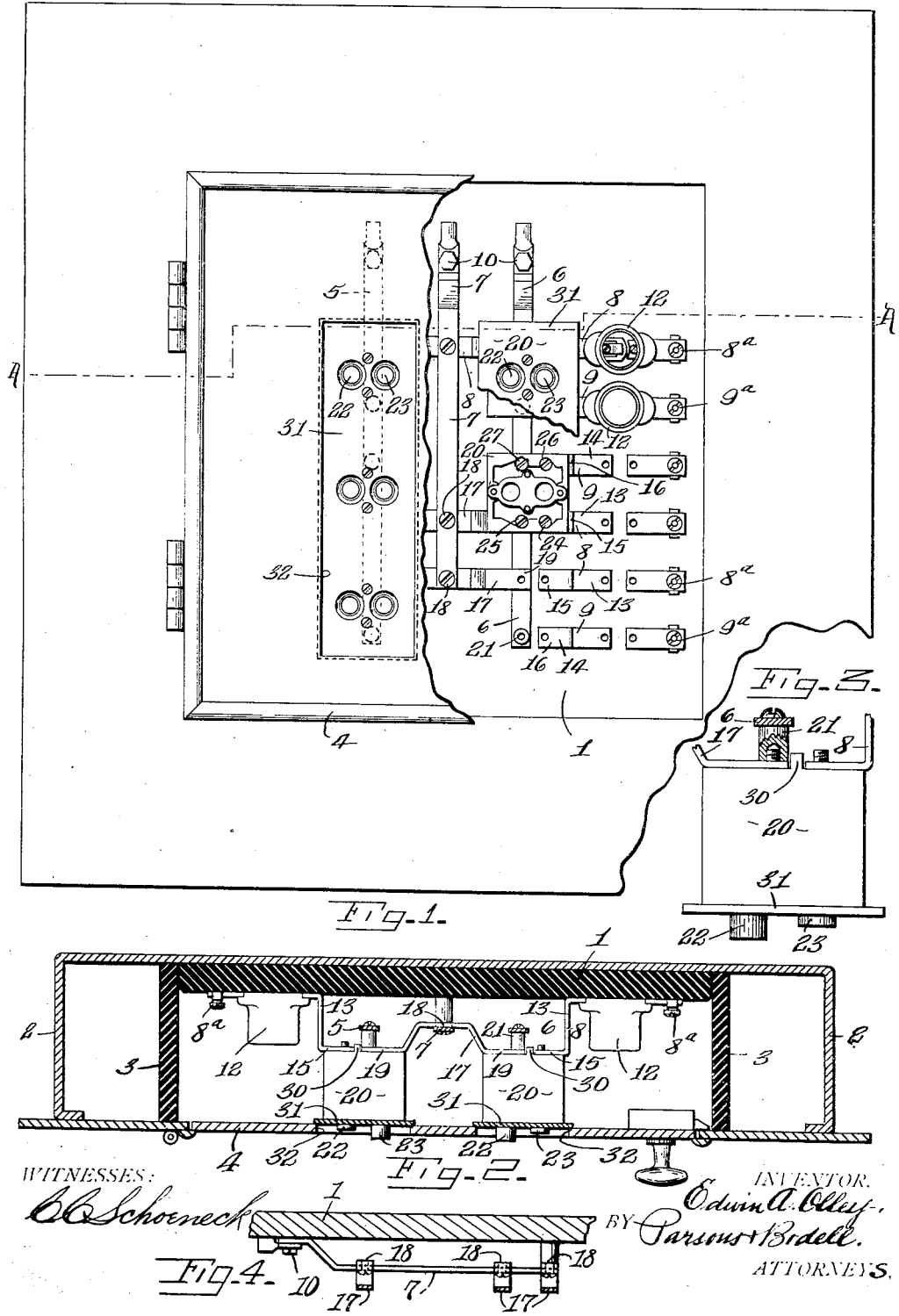

UNITED STATES PATENT OFFICE.

EDWIN A. OLLEY, OF SYRACUSE, NEW YORK, ASSIGNOR TO CROUSE-HINDS COMPANY, OF SYRACUSE, NEW YORK, A CORPORATION OF NEW YORK.

PANEL-BOARD.

1,307,019.          Specification of Letters Patent.      Patented June 17, 1919.

Application filed July 16, 1915. Serial No. 40,158.

*To all whom it may concern:*

Be it known that I, EDWIN A. OLLEY, a citizen of the United States, and a resident of Syracuse, in the county of Onondaga and State of New York, have invented a certain new and useful Panel-Board, of which the following is a specification.

This invention relates to panel boards and has for its object a particularly simple and efficient arrangement of the bus bars and load circuit bars whereby electrical appliances as the switches, which control the flow of current through the load circuits, are compactly arranged so as to reduce the width of the board, and are positioned on the bars with their operating members, as push buttons, exposed through the door of the cabinet in which the panel board is located. The invention consists in the novel features of construction hereinafter set forth and claimed.

In describing this invention, reference is had to the accompanying drawings, in which like characters designate corresponding parts in all the views.

Figure 1 is a face view, partly broken away, of a panel board embodying my invention.

Fig. 2 is a section on the plane of line A—A, Fig. 1.

Fig. 3 is an enlarged detail view of one of the switches and contiguous parts.

Fig. 4 is a detail sectional view illustrating one of the bus bars with one end mounted on the face of the panel board and its intermediate portion and extreme end portion offset from the panel board.

1 designates the base of the panel board which is located in a suitable cabinet 2 on the bottom thereof. 3 are the lining strips. 4 is the door of the cabinet.

The panel board here illustrated is adapted for a three-wire system, and 5, 6, 7 are respectively the outside main bus bars and the neutral bus bar of a three-wire system. 8, 9 designate the members of each pair of load circuit bars, one member, as the member 8, of each pair being electrically connectible to the neutral bus bar 7, and the other bar, as 9, being electrically connectible to one of the outside main bars 5, or 6.

The bus bars 5, 6, 7 are arranged in parallelism to each other and the greater portions thereof are usually offset from the base 1 instead of lying flat on the base, these bars being shown as mounted at corresponding ends, as at 10, on the base, and as having their intermediate as well as their extreme end portions offset from the base.

The bars 8, 9 include sections mounted on the base 1 and connected by fuse plug receptacles 12 or their equivalent, corresponding sections 13, 14 of the bars 8, 9 having end portions 15, 16 offset from the base 1 above the plane of the outside mains 5 or 6. The other sections lie on the base 1 and are provided with binding devices 8ª, 9ª to which the load circuit wires are connected.

The bars 8 of each two pair of load circuit bars on opposite sides of the bus bars include an additional section 17 common to said pairs, which section 17 is supported between its ends at 18 by the neutral bus bar 7, and has each end opposed to the offset end 15 of the corresponding bar 8 of said pairs. The sections 17 are properly lateral branches of the neutral bar 7, but in ordinary panel board construction in which the bars lie on the base 1, they are considered as load circuit bars, and hence are so considered herein.

The offset ends 15, 16 of the bars 8, 9 and the ends 19 of the sections 17 of the bars 8 are offset a greater distance from the base 1 than the main bars 5, 6, 7.

20 are electrical appliances, as switches, by means of which the load circuit bars 8, 9 are electrically connected to the neutral bar 7 and to one or the other of the outside main bars 5 or 6 as the case may be. Each switch comprises a base mounted on, and superposed above, the offset ends 15 and 19 of the sections of a bar 8, the end 16 of the bar 9 and a post or spacer 21 on the contiguous part of the outside main bar 5 or 6, and mechanism by which the circuit is closed through the offset ends 15, 19 of the sections of the bar 8 and through the offset end 16 of the bar 9 and the post 21 on the outside main bar. This mechanism may be of any well known form and is operated by suitable operating means here shown as including push buttons 22, 23.

As the switch mechanism is well known to those skilled in the art, it is thought that description thereof is unnecessary. Each switch is electrically and mechanically connected by screws 24, 25, to the offset ends 15, 17 of the contiguous sections of the bar 8, and by screws 26, 27 to the offset end 16 of the contiguous bar 9 and to the post 21 on the adjacent outside main bar 5 or 6.

The base of each switch 20 is formed with a barrier 30 on its bottom which is located in the space between the offset ends 15, 19 of each bar 8 and between the offset end 16 of each bar 9 and the adjacent post or spacer 21.

As here shown, all of the switches located on one side of the neutral bar 7 are provided with a face plate 31 common to all the switches and those on the other side with a similar face plate 31, and the push buttons 22, 23 project through the face plates. These face plates are usually exposed through openings 32 in the cabinet door 4, and serve to close said openings when the door is closed.

This panel board is particularly advantageous in that owing to the offset bus bars and load circuit bars, the switches controlling the load circuits are positioned most advantageously with their face plates nearly flush with the face of the cabinet door.

What I claim is:—

1. A panel board comprising a base, conductors mounted on the base and having portions grouped together and switches mounted on and superposed above the said grouped portions and operable to electrically connect and disconnect the same, operating means for the switches, a top plate common to all of the switches, said operating means projecting over the top plate, in combination with the cabinet having a movable door formed with an opening arranged to be closed by the top plate when the door is closed, substantially as and for the purpose described.

2. A panel board comprising a base, busbars supported on the base and having their intermediate portions offset from the base, a pair of load circuit bars, the bars of the pair including a section offset from the base and terminating near the offset portion of one of the busbars, a bar section carried by the offset portion of another busbar and extending laterally toward the former busbar and being opposed to the offset end of one of the load circuit bar sections, and a switch mounted on the offset portions of said load circuit bar sections, the laterally extending bar section and on said one of the busbars, substantially as and for the purpose specified.

3. A panel board comprising a base, busbars supported on the base and having their intermediate portions offset from the base, a pair of load circuit bars, the bars of the pair including a section offset from the base and terminating near the offset portion of one of the busbars, a bar section carried by the offset portion of another busbar and extending laterally toward the former busbar and being opposed to the offset end of one of the load circuit bar sections, and a switch mounted on the offset portions of said load circuit bar sections, the laterally extending bar and on said one of the busbars, in combination with a top plate for the switch and a cabinet having a door formed with an opening arranged to be closed by the top plate when the door is closed, substantially as and for the purpose set forth.

4. A panel board comprising a base, busbars supported on the base and having their intermediate portions offset from the base, a pair of load circuit bars, the bars of the pair including a section offset from the base and terminating near the offset portion of one of the busbars, a laterally extending bar carried by the offset portion of another busbar toward the former busbar and being opposed to the offset end of one of the load circuit bar sections, some of the load circuit bar sections, transverse bar sections and busbars being offset from the base different distances, switches mounted on the offset portions of each of the load circuit bars, said one of the busbars and the laterally extending bar, and spacers interposed between the offset portion of some of said bars and the base of the switch, substantially as and for the purpose described.

5. A panel board comprising a base, outside main and neutral bus bars supported on the base and having their intermediate portions spaced apart from the base, pairs of load circuit bars extending crosswise of the bus bars and having their ends mounted on the base and their intermediate portions spaced apart from the base a different distance than the bus bars, some of the load circuit bars including sections common to two pairs of load circuit bars and having intermediate portions connected directly to the neutral bus bar, switches serving to electrically connect the load circuit bars to the bus bars, the switches being mounted on and superposed above, the offset portions of the load circuit bars, and spacers interposed between the outside main bars and the switches, substantially as and for the purpose described.

6. A panel board comprising a base, outside main bars and a neutral bar having their intermediate portions spaced apart from the base, the bars being arranged in parallelism to each other, pairs of load circuit bars extending crosswise of the main bars, each including end sections projecting from the base and having ends offset from the base above the outside main bars, some of the members or sets of the load circuit bars including intermediate sections common to two pairs of load circuit bars and located respectively on opposite sides of the main bars, said sections being connected between their ends to the neutral bar and having their end portions offset from the base and opposed to the offset end portions of the end sections of one set of bars of the pairs, posts rising from the outside main bars and located opposite to the offset ends of the other set of bars of the pairs of load circuit bars, and switches mounted on said offset ends of each pair of load circuit bars and on the posts of the outside main bars opposed to said offset ends and operable to electrically connect said opposed offset ends, and the posts and said offset ends opposed to the posts, substantially as and for the purpose specified.

7. A panel board comprising a base, outside bus bars and a neutral bar supported on the base, posts projecting from the outside bus bars, load circuit conductors extending crosswise of the bus bars and including bar sections secured between their ends to the neutral bus bar and having their opposite ends above the outside bus bars respectively, bar sections rising from the base and having offset ends opposed to the former offset ends, bar sections rising from the base and having offset ends opposed to said posts, and a switch mounted on each pair of opposed offset ends, and on each post and opposing offset end and operating to electrically connect and disconnect each pair of offset ends, and each post and opposed offset end, substantially as and for the purpose set forth.

In testimony whereof, I have hereunto signed my name in the presence of two attesting witnesses, at Syracuse, in the county of Onondaga, and State of New York, this 7th day of March, 1915.

EDWIN A. OLLEY.

Witnesses:
C. C. SCHORNECK,
WM. CORNELL BLANDING.